US006539209B1

(12) United States Patent
Dajer et al.

(10) Patent No.: US 6,539,209 B1
(45) Date of Patent: Mar. 25, 2003

(54) CODE-DIVISION, MULTIPLE-ACCESS BASE STATION HAVING TRANSMIT DIVERSITY

(75) Inventors: Miguel Dajer, Succasunna, NJ (US); Peter Keith LaConte, West Paterson, NJ (US); Harvey Rubin, Morristown, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 347 days.

(21) Appl. No.: 09/580,775

(22) Filed: May 30, 2000

(51) Int. Cl.[7] .............. H03C 7/02; H04B 1/02; H04B 7/02
(52) U.S. Cl. ............ 455/101; 455/102; 455/103; 375/146; 375/267; 375/299
(58) Field of Search ............ 455/277.1, 277.2, 455/101, 73, 562, 102, 103; 375/267, 260, 299, 146; 342/423, 463, 464

(56) References Cited

U.S. PATENT DOCUMENTS

| | | | | |
|---|---|---|---|---|
| 5,243,629 A | * | 9/1993 | Wei | 375/59 |
| 5,471,497 A | * | 11/1995 | Zehavi | 375/200 |
| 5,859,879 A | * | 1/1999 | Bolgiano et al. | 375/347 |
| 6,198,775 B1 | * | 3/2001 | Khayrallah et al. | 375/265 |
| 6,256,356 B1 | * | 7/2001 | Suzuki | 375/260 |
| 6,310,907 B1 | * | 10/2001 | Tsujimoto | 375/141 |
| 6,449,314 B1 | * | 9/2002 | Dabak et al. | 375/267 |

\* cited by examiner

Primary Examiner—Thanh Congle
Assistant Examiner—Tuan Tran
(74) Attorney, Agent, or Firm—Harness, Dickey & Pierce, P.L.C.

(57) ABSTRACT

A single base station supports the non-diversity transmission of a first digital signal type and the diversity transmission of a second digital signal type. The base station includes primary channel boards for modulating and encoding a first digital signal type and secondary channel boards for modulating and encoding a second digital signal type. A first group of transmit radio modules accept the first digital signal type and the second digital signal type and provides a composite electromagnetic output signal. Each transmit radio module is associated with a different sector. A second group of transmit radio modules accept the second digital signal type from secondary channel boards and provide a diverse electromagnetic output signal for complementing the composite electromagnetic output signal.

31 Claims, 10 Drawing Sheets

CODE-DIVISION, MULTIPLE-ACCESS BASE STATION HAVING TRANSMIT DIVERSITY

FIELD OF INVENTION

This invention relates to a code-division, multiple access base station having transmit diversity.

BACKGROUND

Code-division, multiple-access (CDMA) systems have been deployed in the U.S. and elsewhere under the CDMA Telecommunications Industry Association (TIA)/ Electronics Industry Association (EIA) IS-95A and IS-95B standards. Some service providers have expended considerable capital on wireless infrastructure to expand wireless coverage areas to meet subscriber demand. As new standards evolve, the older equipment in service that complies with CDMA TIA/EIA IS-95A and IS-95B is faced with potential obsolescence.

One new CDMA standard is referred to as TIA/EIA IS-2000 or IS-95C. The IS-95C standard is able to enhance system capacity in situations where mobile subscribers have low mobility by transmitting diversity signals from a base station to a mobile station. For example, under the IS-95C standard a base station may use orthogonal transmit diversity. Orthogonal transmit diversity refers to transmitting different portions of a signal from different downlink antennas to a mobile station.

Certain aspects of the IS-95C standard may be added as upgrades to the existing IS95-A or IS-95B base stations. For example, certain IS-95B digital signal processing boards may be replaced with IS-95C digital signal processing boards. However, the feature of orthogonal transmit diversity can not be added by simply upgrading boards in an existing IS-95A or IS95-B base station in the field. Accordingly, in order to provide transmit diversity, some service providers may elect to provide duplicative IS-95C base stations that overlay the coverage of existing IS-95B and IS-95A base stations. Under such circumstances, the service provider may need to provide duplicative base station antennas or even additional monopoles or towers, where tower space is unavailable. Such expenditures may ultimately discourage service providers from embracing and purchasing IS-95C equipment. Thus, a need exists for conveniently upgrading an IS-95B or IS-95A base station to operate under the IS-95C standard with transmit diversity.

SUMMARY OF THE INVENTION

In accordance with one aspect of the invention, a single base station supports the non-diversity transmission of a first digital signal type and the diversity transmission of a second digital signal type. The base station includes primary channel boards for modulating and encoding the first digital signal type and secondary channel boards for modulating and encoding the second digital signal type. A composite signal represents a combination of the first digital signal type and the second digital signal type. A first group of transmit radio modules accepts the composite digital signal from a combiner or a suitable channel board and provides a composite electromagnetic output signal. Each transmit radio module is preferably associated with a different sector. A second group of transmit radio modules accepts the second digital signal type from secondary channel boards and provides a diverse electromagnetic output signal for complementing at least a corresponding diversity component of the composite electromagnetic output signal.

BRIEF DESCRIPTION OF PREFERRED EMBODIMENTS

As used herein, a transmit diversity mode refers to any downlink transmission that is distributed over different antennas in a diversity arrangement. A diversity arrangement refers to space-diversity, angular diversity, polarization diversity, or any combination of the foregoing diversity configurations. Transmit diversity refers broadly to orthogonal transmit diversity, multi-carrier transmit diversity, time-switched diversity, or any combination of the foregoing. Orthogonal transmit diversity encodes a single downlink channel as two channels, with corresponding unique orthogonal codes (e.g., Walsh codes), for transmission over multiple antennas. Multi-carrier transmit diversity distributes a channel among multiple carriers for transmission over multiple antennas. Time-switched transmit diversity switches a channel or component thereof between different antennas for transmission.

Transmit diversity may refer to orthogonal transmit diversity where a code-division multiple-access (CDMA) channel is transmitted over two antennas that are spatially separated to potentially yield a diversity gain at a subscriber station. Orthogonal transmit diversity divides a modulating information signal into diversity component signals distributed among different signal branches for feeding different antennas. A modulating information signal represents speech, data or other communications information, which is preferably in the form of a digitally modulated signal. A rake receiver of a subscriber station reassembles the diversity component signals to reproduce the original modulating information signal by delaying the diversity component signals appropriately for synchronous recombination. If diversity gain is present at the subscriber station, the transmit power to the subscriber station may be reduced, leading to a theoretical increase in system capacity of the wireless system. A plain or non-diversity mode refers to a downlink signal that is transmitted over one antenna.

In orthogonal transmit diversity, the information modulation signal is divided into two components, a first component and a second component. The first component has a first in-phase bit stream and a first quadrature bit stream. The second component has a second in-phase bit stream and a second quadrature bit stream. One orthogonal code (e.g., Walsh code) is applied to the first component and a another orthogonal code (e.g., Walsh code) is applied to the second component. The encoded first component and encoded second component modulates a carrier to provide a first orthogonal signal for transmission over a first antenna and a second orthogonal signal for transmission over a second antenna having a diversity arrangement with respect to the first antenna.

A receiver of the subscriber station initially treats the downlink transmission of an orthogonal transmit diversity signal as two different channels because the first orthogonal signal has a one orthogonal code (e.g., Walsh code) and the second orthogonal signal has another orthogonal code. A rake receiver of a subscriber station assigns fingers to demodulate each of the channels with a unique orthogonal code. Digital signal processing is used to identify a relationship between the two different channels. Related channels are combined at baseband or otherwise to reproduce the modulating information signal applied to the base station.

As used herein, a first digital signal type and a second digital type represent signals that comply with different communication signaling standards applicable to a code-division multiple-access (CDMA) system or another wireless system. The first digital signal type represents a communications signal for transmission in a non-diversity or plane mode, whereas the second digital signal type represents a communications signal for transmission in a transmit diversity mode over at least two antennas. For example, the first digital signal type may be an IS-95A signal or an IS-95B signal. The second digital signal type may be an IS-95C signal. An IS95-C signal may be transmitted in an orthogonal transmit diversity mode over multiple antennas, whereas IS-95A or IS-95B signals are transmitted in a non-diversity or plain mode.

Figure 1A:
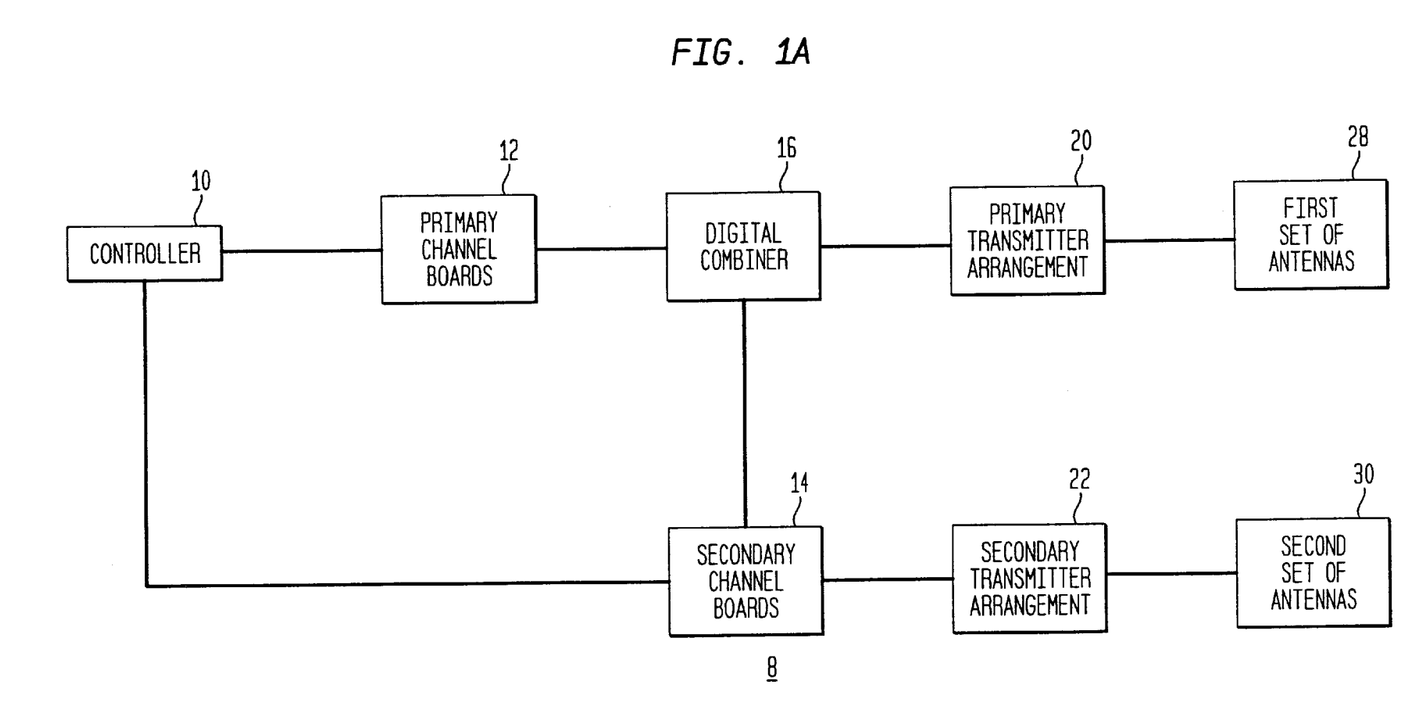
FIG. 1A and FIG. 1B are block diagrams of an upgraded base station in accordance with the invention.
Figure 1B:
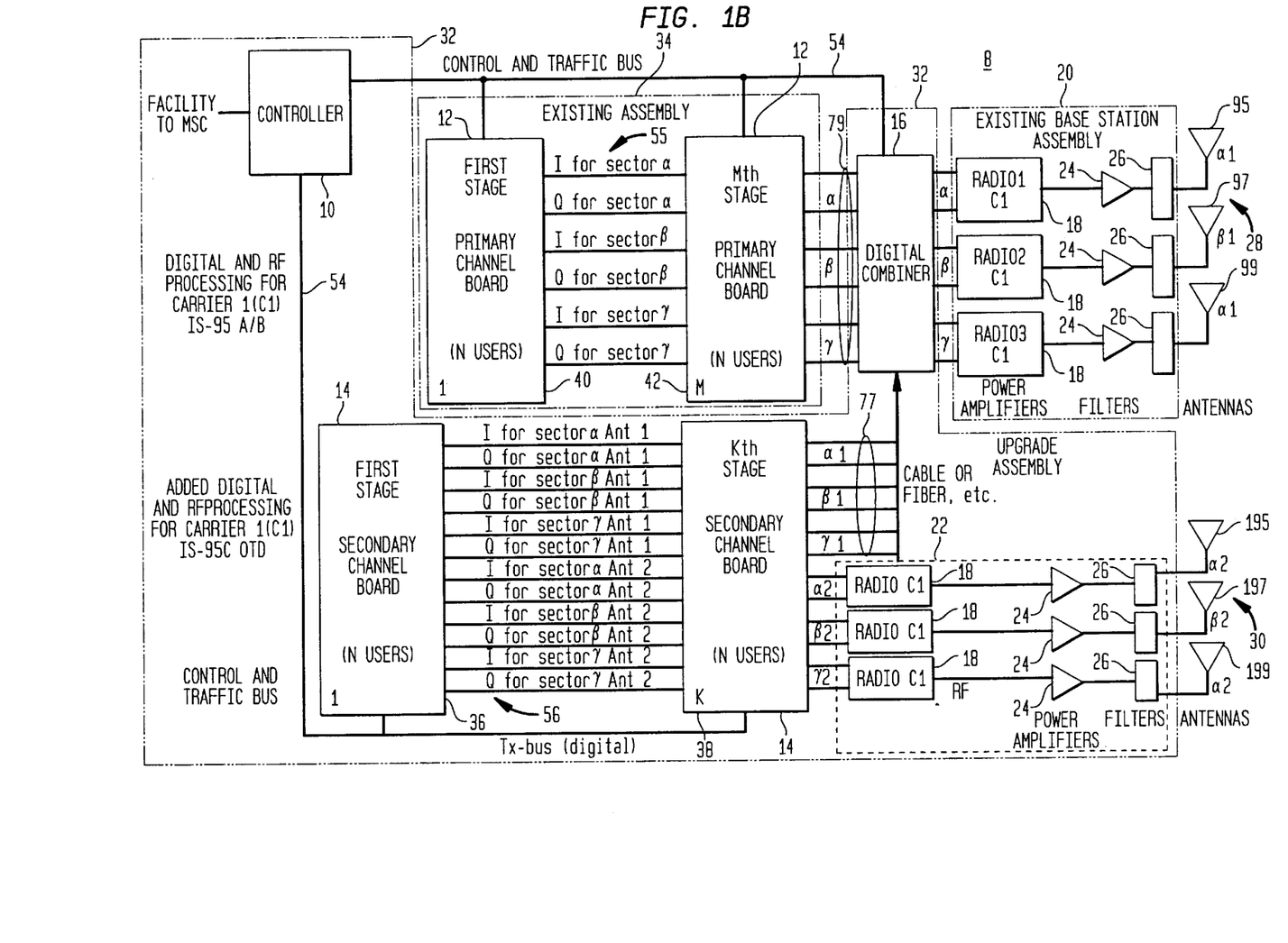

FIG. 1A presents a general block diagram of a base station 8 in accordance with the invention. FIG. 1B provides an example of components for implementing the blocks of FIG. 1A and illustrative interconnections between the components for an exemplary three-sector configuration. The base station 8 supports the non-diversity transmission of a first digital signal type and the diversity transmission of a second digital signal type.

Referring to FIG. 1A, the base station 8 includes a controller 10 for controlling primary channel boards 12 and secondary channel boards 14. The primary channel boards 12 modulate and encode the first digital signal type. The secondary channel boards 14 modulate and encode the second digital signal type. An input of a digital combiner 16 is coupled to the primary channel boards 12 and the secondary channel boards 14. A primary transmitter arrangement 20 is coupled to an output of digital combiner 16. A secondary transmitter arrangement 22 is coupled to an output of the secondary channel boards 14. The primary transmitter arrangement 20 provides a composite electromagnetic output signal. The secondary transmitter arrangement 22 provides a diverse electromagnetic output signal for complementing at least a corresponding diversity component of the composite electromagnetic output signal. The primary transmitter arrangement 20 is coupled to a first set 28 of antennas, and the secondary transmitter arrangement 22 is coupled to a second set 30 of antennas.

Referring to FIG. 1B, the primary transmitter arrangement 20 includes a first group of transmit radio modules 18 for accepting the composite digital signal from the combiner 16 or otherwise. The secondary transmitter arrangement 22 includes a second group of transmit radio modules 18 for accepting the second digital signal type from the secondary channel boards 14. In one embodiment, each transmit radio module 18 is preferably associated with a different sector.

The base station 8 of the invention may result from the upgrading of an existing base station with an upgrade assembly 32, although the base station may be manufactured from scratch as a base station that supports transmission in a transmit diversity mode and a non-diversity. FIG. 1B illustrates the components of one embodiment of an existing assembly 34 and an upgrade assembly 32. The upgrade assembly 32 cooperates with the existing assembly 34 to make the existing assembly 34 capable of transmit diversity operation. The existing assembly 34 includes at least primary channel boards 12 and a primary transmitter arrangement 20. The upgrade assembly 32 preferably includes secondary channel boards 14, a controller 10 for controlling the primary channel boards 12 and the secondary channel boards 14, a digital combiner 16, and a secondary transmitter arrangement 22.

The controller 10 is coupled to the primary channel boards 12, the secondary channel boards 14, and the digital combiner 16 via a control and traffic bus 54. The primary channel boards 12 are coupled in tandem with respect to each other via a first transmit bus 55 to route a first digital signal type to a primary transmitter arrangement 20. The primary transmitter arrangement 20 has separate signal branches associated with corresponding different sectors. As illustrated in FIG. 1B, three different sectors are present and are designated an alpha sector, a beta sector, and a gamma sector, although in an alternate embodiment virtually any number of sectors is possible and falls within the scope of the invention. The primary transmitter arrangement 20 is coupled to a first alpha antenna 95, a first beta antenna 97, and a first gamma antenna 99 of the first set 28 of antennas.

The secondary channel boards 14 are coupled in tandem with respect to one other via a second transmit bus 56. The secondary channel boards 14 are coupled to the digital combiner 16 and the secondary transmitter arrangement 22. The secondary channel boards 14 are adapted to provide digital signal processing, such as modulating and encoding of baseband signals in accordance with a second digital signal type (e.g., IS-95C). The secondary channel boards 14 route one diversity component of the processed second digital signal type to the primary transmitter arrangement 20 via the digital combiner 16. The secondary channel boards 14 route another diversity component of the second digital signal type to the secondary transmitter arrangement 22. As shown in FIG. 1B, the secondary transmitter arrangement 22 has separate signal branches associated with corresponding different sectors, including the alpha sector, the beta sector, and the gamma sector, although other antenna configurations are possible. The secondary transmitter arrangement 22 is coupled to a second alpha antenna 195, a second beta antenna 197, and a second gamma antenna 199 of the second set 30 of antennas.

The first alpha antenna 95 and the second alpha antenna 195 preferably serve the alpha sector with overlapping antenna radiation patterns. The first beta antenna 97 and the second beta antenna 197 preferably serve the beta sector. The first gamma antenna 99 and the second gamma antenna 199 preferably serve the gamma sector.

In the transmit diversity mode, the base station 8 may transmit a downlink signal of the second digital signal type (e.g., IS-95C) simultaneously over different antennas associated with any one of the sectors. In one example, a downlink channel of the second digital signal type is transmitted as diversity component signals contemporaneously over the first alpha antenna 95 and the second alpha antenna 195. In another example, a downlink channel of the second digital signal type is transmitted contemporaneously as diversity component signals over the first beta antenna 97 and the second beta antenna 197. In yet another example, a downlink channel of the second digital signal type is transmitted contemporaneously as diversity component signals over the first gamma antenna 99 and the second gamma antenna 199. The diversity component signals contain the in-phase (I) and quadrature (Q) symbol streams derived from sampling groups of the information signal. In the plain mode, the base station 8 transmits a downlink signal of the first digital signal type (e.g., IS-95A) solely over a sector of the first set 28 of the antennas. The base station 8 may operate in the plain mode and the transmit diversity mode at the same time over different downlink channels on the same carrier, for example.

The base station 8 handles the channels assigned to a non-diversity mode in the following manner. The controller 10 provides information for transmission over downlink channels of the first digital type to the primary channel boards 12 over the control and traffic databus 54. The primary channel boards 12 range from a first primary channel board 40 to an Mth primary channel board 42, wherein each channel board serves at least one forward channel of the air interface. The primary channel boards 12 are adapted to provide digital signal processing, such as modulating and encoding of baseband signals in accordance with IS-95A and IS-95B.

The base station 8 handles the channels assigned to a diversity mode in the following manner. The controller 10 provides information for transmission over downlink channels of the second digital type to the secondary channel boards 14 over the control and traffic databus 54. The secondary channel boards 14 range from a first secondary channel board 36 to a Kth secondary channel board 38. Although M preferably equals K such that all channels can operate in the transmit diversity mode, in an alternate embodiment M may differ from K. Thus, the same base station 8 can support the operation of subscriber stations operating in the IS-95A mode, the IS-95B mode, and the IS-95C mode. The IS-95A subscriber stations and the IS-95B subscriber stations realize the benefit of backwards compatibility, whereas the IS-95C subscriber stations allow the service provider to enhance wireless system capacity through transmit diversity.

The primary channel boards 12 may be arranged in stages and may be interconnected by first transmit bus 55 such that an output of one primary channel board 12 becomes the input of the next primary channel board 12 to facilitate the addition of calls to appropriate composite signals associated with the sectors. The primary channel boards 12 add the digital baseband signals together for the active channels on a given sector to generate composite spread-spectrum in-phase and quadrature signals for each sector. The composite in-phase and quadrature signals are present on the first transmit bus 55 from the second stage to the last stage (i.e., Mth primary channel board 42) of primary channel boards. The second stage refers to the primary channel board 12 is coupled in tandem with the first primary channel board 40 between the first primary channel board 40 and the Mth primary channel board 42.

Each primary channel board 12 performs the addition for calls and sectors assigned to the particular primary channel board 12. As illustrated in FIG. 1B, each primary channel board 12 processes calls for up to three sectors, so three composite in-phase and quadrature signals are provided as output from the second primary channel board to the Mth primary channel board 42. The primary channel boards 12 combine different channels associated with the same sectors on a sector-by-sector basis.

The secondary channel boards 14 generates composite signals on a sector-by-sector basis. The secondary channel boards 14 add different calls to composite signals in a stage-by-stage basis as do the primary channel boards 12.

The first primary channel board 40 supports at least one non-diversity downlink communications channel. As illustrated in FIG. 1B, the first primary channel board 40 need not include an input interface and may include an output interface for serving different sectors. For example, the output interface may provide six output ports including an in-phase component and a quadrature component as digital baseband signals for the alpha sector, the beta sector, and the gamma sector. The second primary channel board through the Mth primary channel board 42 may each include an input interface and an output interface for cascading the primary channel boards 12 into multiple stages to serve multiple channels.

In an alternate embodiment, to achieve manufacturing economies of scale, the first primary channel board 40 through the Mth primary channel board 42 may be identical such that each primary channel board 12 includes input interfaces and output interfaces. Accordingly, if present, the input interface of the first primary channel board 40 would be terminated by load resistors, to match the impedances of the input interface, or arranged in another suitable manner.

The first secondary channel board 36 supports at least one diversity downlink communications channel. As illustrated in FIG. 1B, the first secondary channel board 36 need not include an input interface and may include an output interface for serving different sectors. For example, the output interface may provide twelve output ports including an in-phase component and a quadrature component as digital baseband signals for the alpha sector, the beta sector, and the gamma sector of the first set 28 of antennas and the second set 30 of antennas. The second secondary channel board through the Kth secondary channel board 38 may each include an input interface and an output interface for cascading the secondary channel boards 14 into multiple stages to serve multiple diversity channels.

In an alternate embodiment, to achieve manufacturing economies of scale, the first secondary channel board 36 through the Kth secondary channel board 38 may be identical such that each secondary channel board 14 includes input interfaces and output interfaces. Accordingly, if present, the input interface of the first secondary channel board would be terminated by load resistors, to match the impedances of the input interface, or arranged in another suitable manner.

As shown in FIG. 1B, the outputs 79 of the primary channel boards 12 and certain output ports 77 of the secondary channel boards 14 are coupled to input ports of the digital combiner 16. The certain output ports 77 of the secondary channel boards 14 preferably provide one digital signal component (for transmission on the first set 28 of antennas) that corresponds to another digital signal component of the second digital signal type (for transmission on the second set 30 of antennas). The digital combiner 16 preferably accepts inputs from the output interface of the Mth primary channel board 42 and inputs associated with the certain output ports 77 of the output interface of the Kth secondary channel board 38. The certain output ports 77 of the output interface of the Kth secondary channel board 38 include output signals intended for the sectors of the first set 28 of antennas. In one embodiment, a portion of the output interface of the Kth secondary channel board 38 is coupled to the digital combiner 16 via multiconductor cable.

In another embodiment, certain output ports 77 of the secondary channel boards 14 are coupled to the combiner board via a fiber optic interface. The fiber optic interface may comprise a pair of optical transceivers interconnected by a fiber optical communications cable. The digital combiner 16 may include output ports coupled to the primary transmitter arrangement 20. The digital combiner 16 passes the first signal type from the primary channel boards 12 to the primary transmitter arrangement 20.

The primary transmitter arrangement 20 includes transmit radio modules 18 coupled to corresponding power amplifiers 24 to support the different signal branches associated with corresponding sectors. The transmit radio modules 18 may comprise upconverters that convert a baseband signal of the first signal type, the second signal type, or a composite signal including the first signal type and the second signal type to a radio frequency or microwave frequency for transmission to a subscriber station. For example, the transmit radio modules 18 may generate a low power radio-frequency signal at the desired carrier frequency that incorporates the modulated in-phase and quadrature baseband signals associated with one of the sectors. The power amplifiers 24 may be coupled to filters 26, such as passband filters or notch filters, to limit the downlink transmission of the base station 8 to a desired bandwidth. The primary transmitter arrangement 20 may be coupled to the first set 28 antennas (e.g., directional antennas). In one embodiment, each transmit radio module 18, power amplifier 24, and filter 26 of the primary transmitter arrangement 20 is associated with a corresponding sector of the first set 28 of antennas.

The secondary transmitter arrangement 22 may be coupled to the output interface of the Kth secondary channel board 38. The secondary transmitter arrangement 22 may include transmit radio modules 18 coupled to corresponding power amplifiers 24 to support the different signal branches associated with corresponding sectors. The power amplifiers 24 may be coupled to filters 26. The secondary transmitter arrangement 22 may be coupled to a second set 30 of directional antennas. In one embodiment, each transmit radio module 18, power amplifier 84, and filter 26 of the secondary transmitter arrangement 22 is associated with a corresponding sector of the second set 30 of antennas.

The primary transmitter arrangement 20 accepts a first digital signal type and a second digital signal type for transmission as a downlink transmission. The first digital signal type is associated with a non-diversity transmit channel, whereas the second digital signal type is associated with a diversity transmit channel. The primary transmitter arrangement 20 supports a first set 28 of diversity signal branches that extend from an input of the primary transmitter arrangement 20 to a first set 28 of antennas for the alpha sector, the beta sector, and the gamma sector. The secondary transmitter arrangement 22 supports a second set 30 of diversity signal branches that extend from an input of the secondary transmitter arrangement 22 to a second set 30 of antenna for the alpha sector, the beta sector, and the gamma sector.

The second set 30 of antennas is preferably spatially separated from the first set 28 of antennas by an amount sufficient to produce spatial diversity gain for a subscriber station receiving a downlink transmission from the first set 28 and the second set 30. For example, if the first set 28 of antennas includes directional antennas for three sectors of a cell and the second set 30 of antennas includes directional antennas for the same three sectors, the antennas serving the same sector preferably are separated with a range from five wavelengths to twenty wavelengths at the frequency of operation. That is, a pair of spatially diverse antennas may be provided for each sector. The second digital signal type and the first digital signal type may share one antenna of the pair. The second digital signal type is carried on another antenna of the pair.

In alternate embodiments, alternate diversity arrangements other than spatial diversity may be used, either separately or in combination, to improve downlink transmit performance. Such alternate diversity arrangements include angular diversity and polarization diversity between the first set 28 of antennas and the second set 30 of antennas. Angular diversity refers to antennas that are aimed differently within a sector. For example, the first set 28 of antennas and the second set 30 of antennas may be angularly offset by a certain number of degrees in azimuth, elevation, or both for the alpha sector, the beta sector, and the gamma sector. Polarization diversity refers to antennas with different polarizations. For example, the first set 28 of antennas and the second set 30 of antennas may be cross-polarized with respect to each other within the alpha sector, the beta sector, and the gamma sector.

Figure 2A:
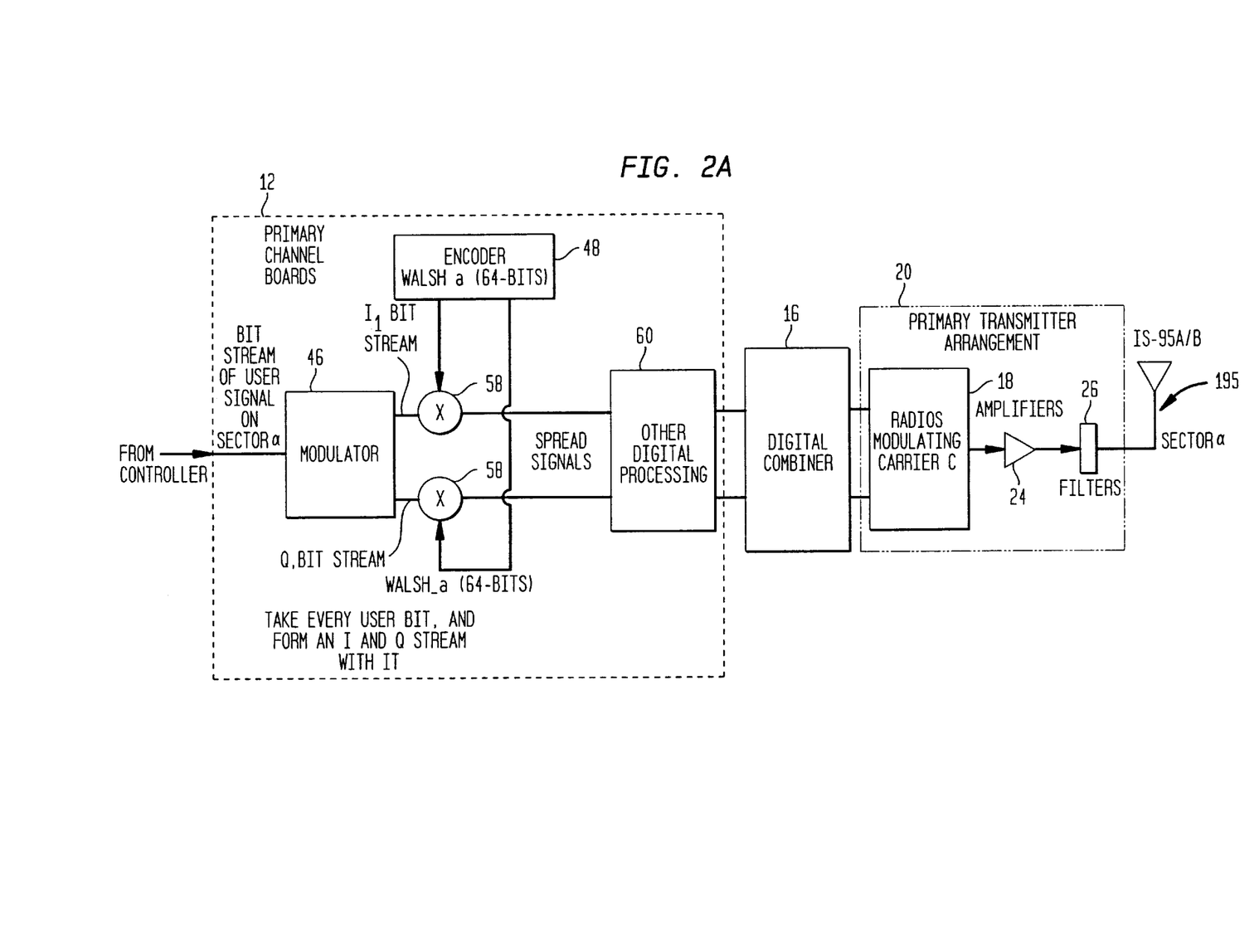
FIG. 2A is a block diagram illustrating an IS-95A or IS-9B operational mode of the base station of FIG. 1A and FIG. 1B.

FIG. 2A shows selected components, of the base station 8 of FIG. 1A and FIG. 1B, for operation in the IS 95A or IS-95B mode. Certain other components of the base station 8 for operating in other modes than IS-95A or IS-95B have been omitted for clarity. Like reference numbers in FIG. 1A, FIG. 1B, and FIG. 2A indicate like elements.

The primary channel boards 12 accept an input signal of user-generated information (e.g., voice or data information) from the controller 10 and provide modulated, encoded baseband output signal to the primary transmitter arrangement 20 via the digital combiner 16. The primary channel boards 12 include a modulator 46 coupled to mixers 58. An encoder 48 provides an input into the mixers 58. An output of the mixers 58 may be coupled to a digital signal processing system 60 for other digital signal processing.

The input signal comprises a bit stream of a user signal intended for transmission on a sector, such as the alpha sector, to a subscriber station operating in the IS-95A mode or the IS-95B mode. The modulator 46 takes alternating bits (e.g., every other bit) of the input signal to form an in-phase bit stream and an quadrature bit stream of a digital baseband signal from the input signal. The encoder 48 may encode the in-phase bit stream and the quadrature bit stream with a sixty-four bit long Walsh code, for example, to define a downlink channel distinguishable from other downlink channels on a CDMA carrier. The encoded in-phase bit stream and the encoded quadrature bit stream are processed by the digital signal processing system 60 and passed through the digital combiner 16 to the primary transmitter arrangement 20. The primary transmitter arrangement 20 transmits the processed in-phase and quadrature bit streams as a composite radio frequency or microwave signal over one antenna for a particular sector associated with the first set 28 of antennas.

Figure 2B:
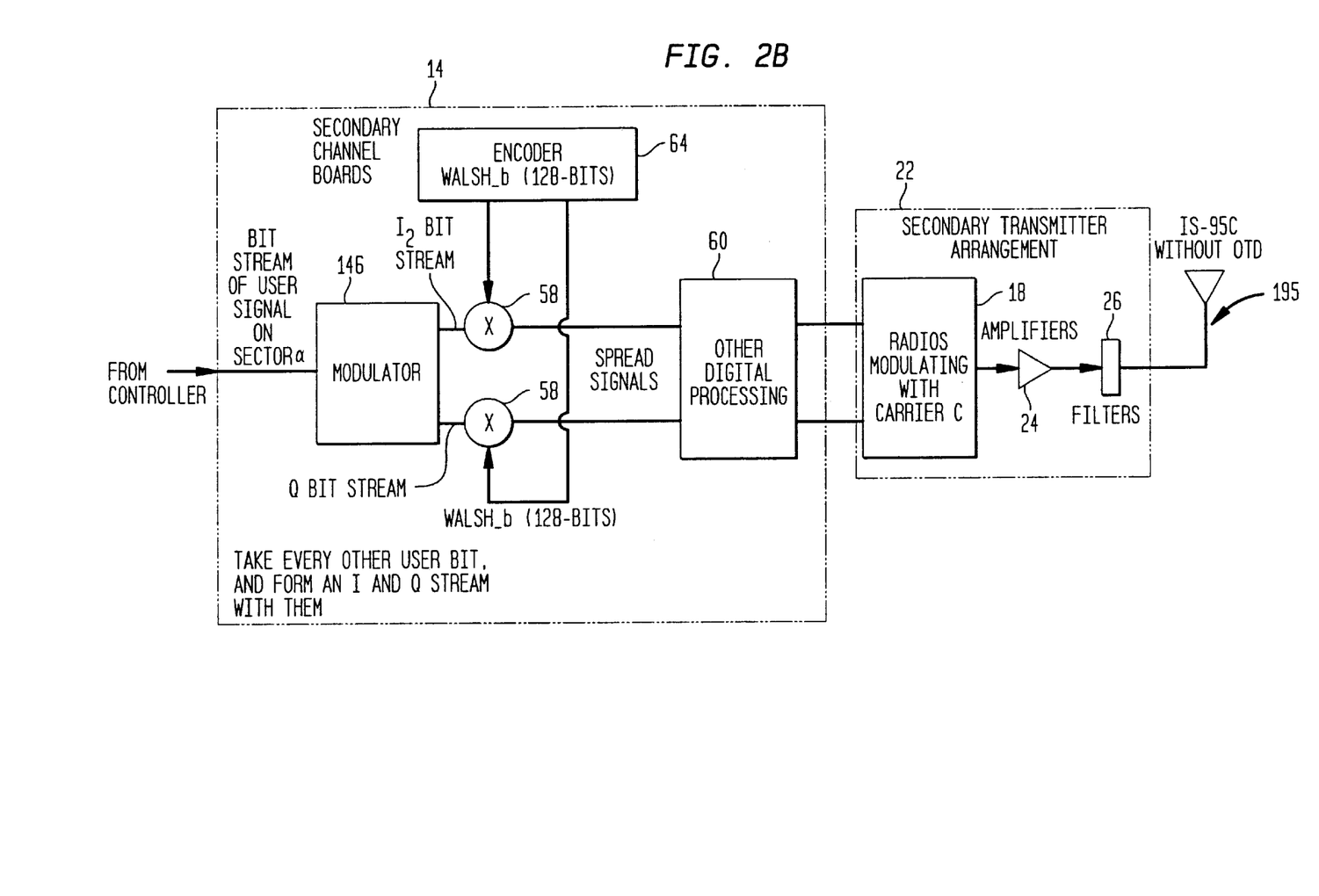
FIG. 2B is a block diagram illustrating an IS-95C mode without orthogonal transmit diversity of the base station of FIG. 1A and FIG. 1B.

FIG. 2B shows selected components, of the base station 8 of FIG. 1A and FIG. 1B, for operation in the IS-95C mode without transmit diversity, consistent with supporting dual mode operation of a base station in a transmit diversity mode and a non-diversity transmit mode in accordance with one embodiment of the invention. Some components of the base station 8 of FIG. 1A and FIG. 1B for operating in other modes other than IS-95C have been omitted for clarity. Like reference numbers in FIG. 1A, FIG. 1B and FIG. 2B indicate like elements.

The secondary channel boards 14 accept a user-generated input (e.g., data or voice) signal from the controller 10 and provide a modulated, encoded baseband output signal to the secondary transmitter arrangement 22. The secondary channel boards 14 include a modulator 146 coupled to mixers 58. An encoder 64 provides an input into the mixers 58. The encoder 64 may encode the in-phase bit stream and the quadrature bit stream with a one-hundred twenty-eight bit long Walsh code, for example, to define a downlink channel distinguishable from other downlink channels on a CDMA carrier. An output of the mixers 58 may be coupled to a digital signal processing system 60 for other digital signal processing.

The user-generated input signal comprises a bit stream intended for a downlink transmission on a sector, such as the alpha sector to a subscriber station. The modulator 146 takes alternating bits (e.g., every other bit) of the input signal to form a baseband signal with an in-phase bit stream and a quadrature bit stream from the input signal. The secondary channel boards 14 feed the secondary transmitter arrangement 22. The in-phase bit stream and the quadrature bit stream may be transmitted as a composite radio frequency or microwave signal over one antenna for a particular sector associated with the second set 30 of antennas.

Figure 2C:
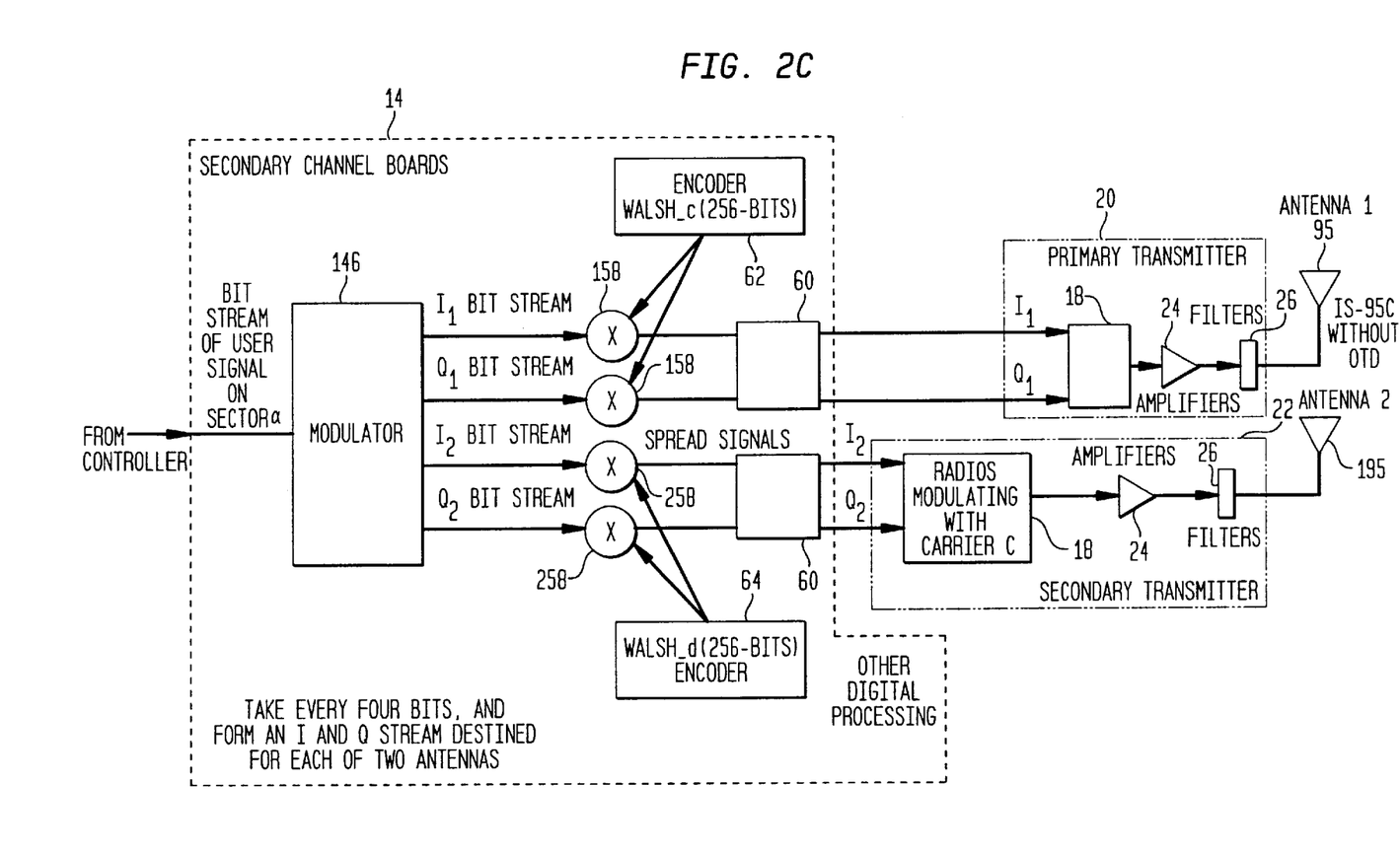
FIG. 2C is a block diagram illustrating an IS-95-C mode with orthogonal transmit diversity of the base station of FIG. 1A and FIG. 1B.

FIG. 2C illustrates the base station 8 of FIG. 1A and FIG. 1B operating in a IS-95C mode with transmit diversity. FIG. 2C shows selected components for operation in the IS-95C mode with transmit diversity. Some components of the base station 8 for operating in other modes have been omitted for clarity. Like reference numbers in FIG. 1A, FIG. 1B, and FIG. 2C indicate like elements.

The secondary channel boards 14 accept an input signal of user-generated information (e.g., voice or data information) from the controller 10. The secondary channel boards 14 provide modulated, encoded baseband output signal to the primary transmitter arrangement 20 and the secondary transmitter arrangement 22. The secondary channel boards 14 include a modulator 146 coupled to two pairs of mixers. A first encoder 62 provides an input to a first pair 158 the mixers and a second encoder 64 provides an input to a second pair 258 of the mixers. Outputs of the first pair 158 and the second pair 258 of the mixers may be coupled to at least one digital signal processing system 60.

The input signal comprises a bit stream of a user signal intended for diversity transmission on a sector, such as the alpha sector of the first set 28 of antennas and the alpha sector of the second set 30 of antennas. The modulator 46 takes alternating bits of the input signal to form a first in-phase bit stream, a second in-phase bit stream, a first quadrature bit stream, and a second quadrature bit stream of a digital baseband signal from the input signal. Together, the first and second in-phase bit stream and the first and second quadrature bit stream contain the information of single downlink channel based on the user-generated input. The first encoder 62 may encode the first in-phase bit stream and the first quadrature bit stream with one two-hundred fifty-six bit long Walsh code, for example, to define a part of a downlink channel distinguishable from other downlink channels on a CDMA carrier. The second encoder 64 may encode the second in-phase bit stream and the second quadrature bit stream with one two-hundred fifty-six bit long Walsh code, for example, to define the remaining part of a downlink channel distinguishable from other downlink channels on the CDMA carrier. The encoded first in-phase bit stream and first quadrature bit stream are transmitted as a composite radio frequency or microwave signal over one antenna for a particular sector associated with the first set 28 of antennas. The encoded second in-phase bit stream and second quadrature bit stream are transmitted as a composite radio frequency or microwave signal over an antenna for the particular sector associated with the second set 30 of antennas. Upon receiving the first in-phase bit stream, the second in-phase bit stream, the first quadrature bit stream and the second quadrature bit stream, a subscriber station reconstructs a replica or representation of the user input signal. Advantageously, the mobile station may realize diversity gain if redundant information exists on the diversity signal components from the first set 28 and the second set 30. The highest diversity gain realizable results when the diversity signal components from the first set 28 and the second set 30 are generally uncorrelated.

Figure 3A:
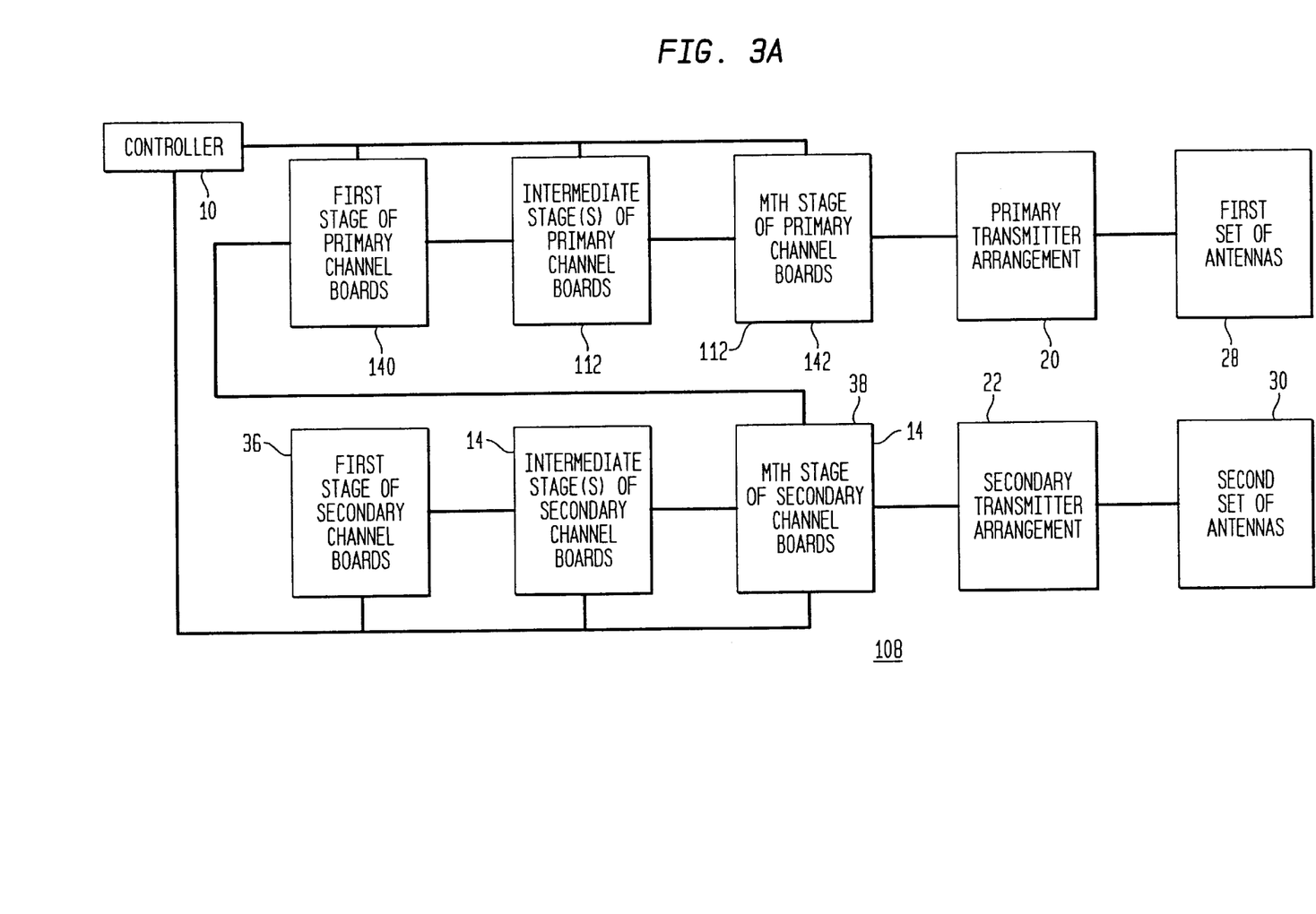
FIG. 3A and FIG. 3B are block diagrams of an alternate embodiment of an upgraded base station in accordance with the invention.
Figure 3B:
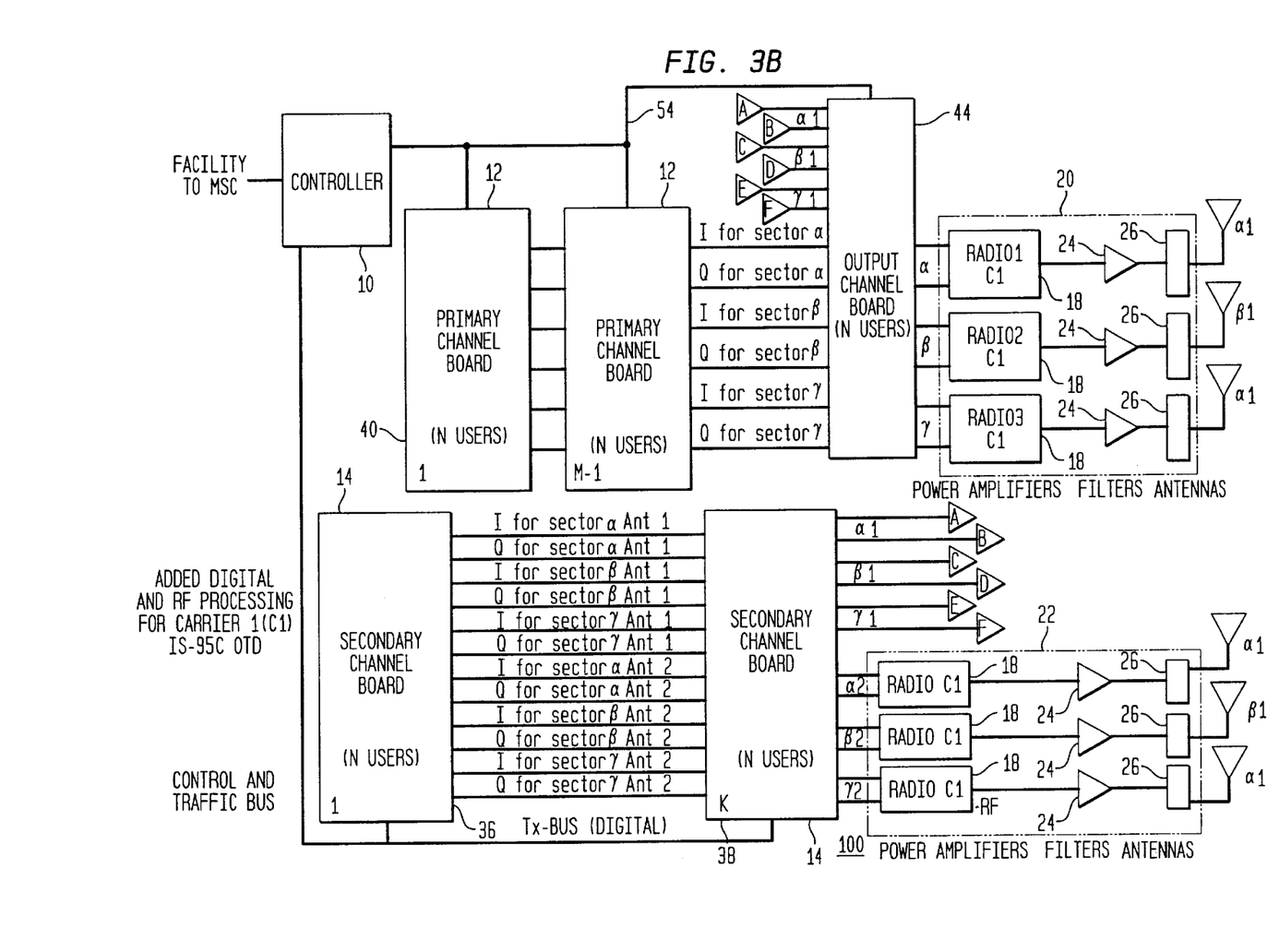

FIG. 3A and FIG. 3B show an alternate embodiment of the base station of FIG. 1A and FIG. 1B. Like reference numbers in FIG. 1A, FIG. 1B, FIG. 3A, and FIG. 3B indicate like elements. The base station 108 of FIG. 3A and FIG. 3B is similar to the base station 8 of FIG. 1A and FIG. 1B except the base station 108 of FIG. 3A and FIG. 3B excludes the digital combiner 16 and the Mth primary channel board 42. Instead, FIG. 3A and FIG. 3B each include M−1 (i.e., M minus one) primary channel boards 12 and an output channel board 44. The output channel board 44 includes an input interface coupled to the primary channel boards 12 and the secondary channel boards 14. The output channel board 44 includes an output interface coupled to the primary transmitter arrangement 20.

FIG. 3A presents a general block diagram of the base station 108. FIG. 3B provides an example of components for implementing the blocks of FIG. 3A and illustrative interconnections between the components for an exemplary three-sector configuration. The primary channel boards 12 are coupled in tandem to route a first digital signal type to the output channel board 44. The output channel board 44 supports the input of the first digital signal type and the second digital signal type to signal branches associated with corresponding different sectors. The output channel board 44 preferably includes twice as many ports for the input interface as for the output interface to accommodate operation in the IS-95C mode with orthogonal transmit diversity.

Figure 4A:
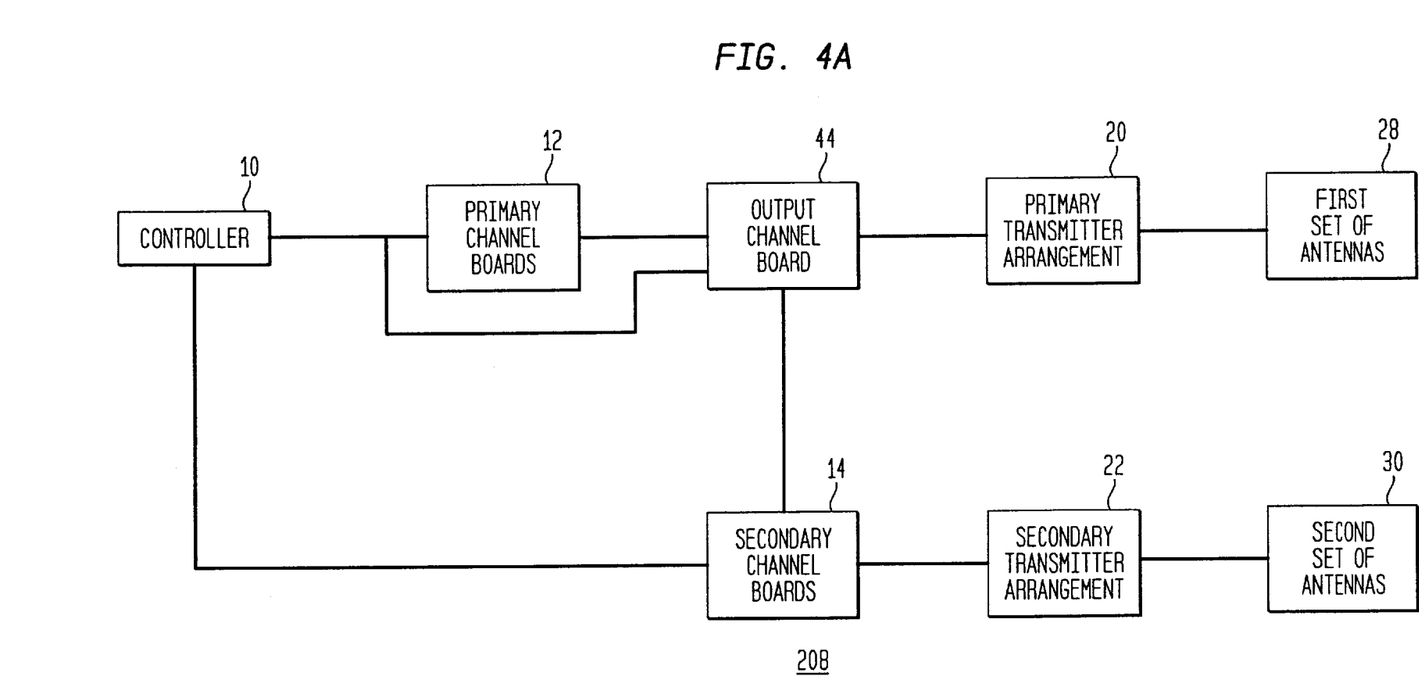
FIG. 4A and FIG. 4B are block diagrams of another alternate embodiment of an upgraded base station in accordance with the invention.
Figure 4B:
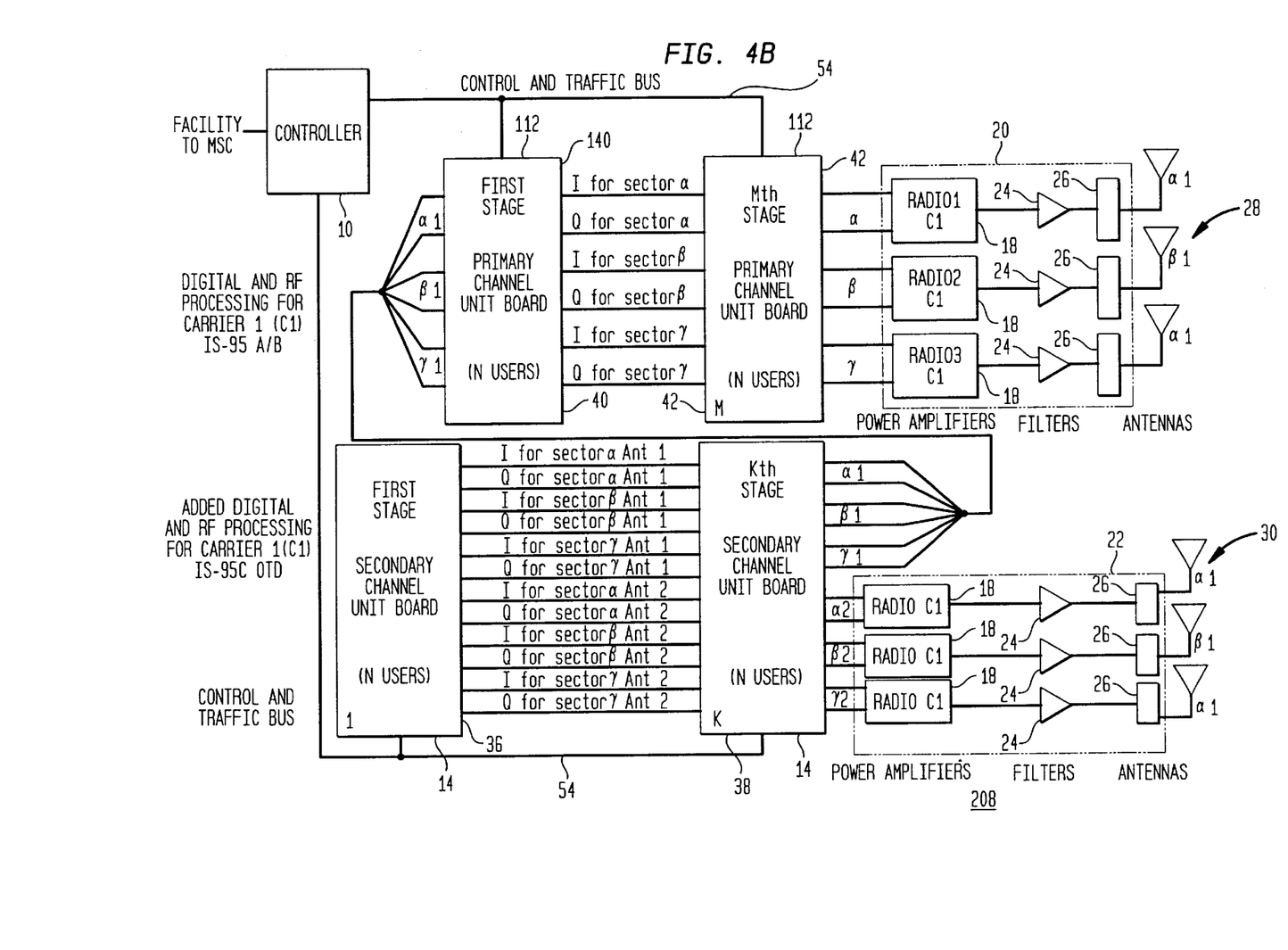

FIG. 4A and FIG. 4B show an alternate embodiment of the base station 8 of FIG. 1A and FIG. 1B. The base station 208 of FIG. 4A and FIG. 4B is similar to the base station 8 of FIG. 1A and FIG. 1B except the base station 208 of FIG. 4A and FIG. 4B excludes the digital combiner 16 and features a different first primary channel board 140. Like reference numbers in FIG. 1A, FIG. 1B, FIG. 4A, and FIG. 4B indicate like elements. The primary channel boards in FIG. 4A and FIG. 4B are designated with reference numeral 112. The first primary channel board 140 of FIG. 4A and FIG. 4B has an input interface for accepting outputs from the secondary channel boards 14. Accordingly, the input interface of the first primary channel board 140 has a number of input ports commensurate with or equal to the number of output ports of the output interface of the Kth secondary channel board 38.

Various modifications of the examples shown in FIG. 1A through FIG. 4B, inclusive, are possible. For example, any of the primary channel boards may have an additional input pins to accept a second digital signal type for combining with the first digital signal type present on the primary channel boards. The second digital signal type may be routed from connection of the secondary channel boards to the additional pins of the primary channel boards. In another example, the transmit radio modules of the primary transmitter arrangement may be equipped with an integral combiner for combining the first digital signal type and the second digital signal type.

Although the base station of the invention has been described primarily with reference to orthogonal transmit diversity, in an alternate embodiment, the base station may support multi-carrier transmit diversity where a code-division multiple-access carrier is transmitted from multiple antennas in a diversity arrangement to form a wideband signal supporting a group of channels. Accordingly, the in-phase and the quadrature signals in any of FIG. 1B, FIG. 3B, and FIG. 4B may represent multiplexed in-phase signals and multiplexed quadrature signals of different channels from multiple CDMA carriers. The electromagnetic signal transmitted from a sectorized antenna could contain modulated information for multiple CDMA carriers or a single CDMA carrier.

Multiplexed in-phase signals and multiplexed quadrature signals, as applicable to FIG. 1B, FIG. 3B, or FIG. 4B, represent an example of a multi-carrier configuration in accordance with the invention, other configurations may combine signals from different carriers in a primary transmitter arrangement, a second transmitter arrangement, or otherwise. By using multiplexed in-phase signals and multiplexed quadrature signals, the composite electromagnetic output signal may be transmitted over at least two carriers within different frequency ranges to facilitate multi-carrier diversity. Similarly, by using the multiplexed in-phase signals and multiplexed quadrature signals, the diverse electromagnetic output signal may be transmitted over at least two carriers within different frequency ranges. Such multi-carrier diversity may be carried out simultaneously with orthogonal transmit diversity, if desired. Transmitting an electromagnetic signal over a relatively wide bandwidth formed by at least two carriers tends to improve fading characteristics of the transmitted signal.

In a multi-carrier transmit diversity configuration, a wideband CDMA signal may be separated for transmission as multiple (e.g., three) carriers within multiple (e.g., three) different frequency ranges. A downlink channel is distributed over multiple carriers in the multi-carrier transmit diversity configuration. Accordingly, the receiver uses information from multiple carriers to recover a single channel. Under a multi-carrier transmit diversity configuration, more than one carrier may be transmitted on a single antenna. For example, if three carriers are present, a first and second carrier may be transmitted from a first antenna and a third carrier may be transmitted from a second antenna in a diversity arrangement with respect to the first antenna. Multi-carrier transmit diversity may transmit one carrier per antenna, where the receiver uses information from the multiple carriers to recover each channel.

Although the base station of the invention has been described primarily with reference to orthogonal transmit diversity, in an alternate embodiment, the base station may support time-switched diversity. Time-switched diversity refers to switching a downlink transmission or components thereof between or among antennas (e.g., between the first set 28 and the second set 30). Time-switched diversity may be accomplished at the radio frequency level or microwave frequency level after processing by the primary channel boards (e.g., 12) and secondary channel boards (e.g., 14). For example, a radio frequency switching matrix could be coupled between an output of the primary transmitter arrangement 20 and the first set 28 and between an output of the secondary transmitter arrangement 22 and the second set 30 to facilitate time-switched diversity operation.

Changes in the active interconnections, between the input ports and output ports of the switching matrix, may be accomplished according to a pseudo-random code or otherwise. The switching matrix may alternate the transmission of the composite electromagnetic output signal between or among different diverse antennas in accordance with a defined sequence, such as a pseudo-random code. The switching matrix may alternate the transmission of the diverse electromagnetic output signal between or among different diverse antennas in accordance with a defined sequence, such as a pseudo-random code. Time-switched diversity may be carried out simultaneously with orthogonal transmit diversity, if desired.

Figure 5:
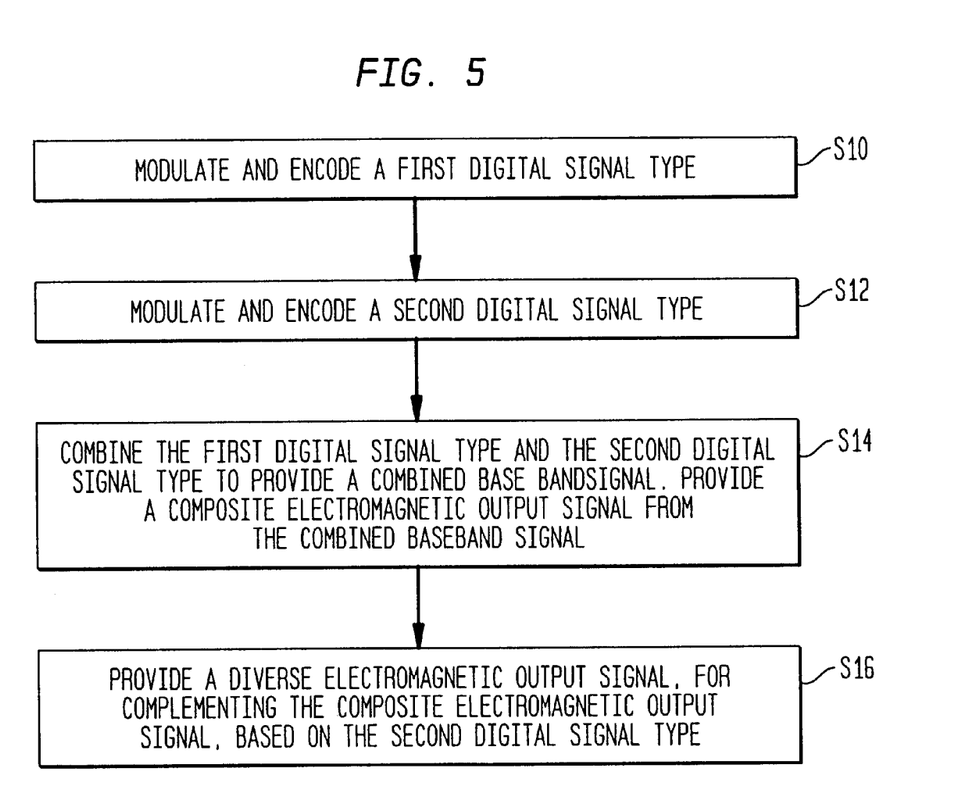
FIG. 5 is a flow chart of a method for transmitting transmit diversity signals in accordance with the invention.

FIG. 5 is a flow chart of a method for transmitting transmit diversity signals in accordance with the invention. The method begins in step S10. In step S10, a first digital signal type is modulated and encoded. The first digital signal type may be modulated with a first modulating information signal. The first modulating information signal represents speech information or data to be sent to one subscriber station. The first digital signal type is encoded with one orthogonal code per each active subscriber station to define one or more downlink channels. In the context of CDMA, the orthogonal code is preferably a Walsh code. In one embodiment, the first digital signal type comprises an International Standard (IS)-95A signal or an International Standard (IS)-95B signal.

In step S12, the second digital signal type is modulated with a second modulating information signal, distinct from the first modulating information signal. The second modulating information signal represents speech information or data to be sent to another subscriber station, different from the subscriber station referenced in step S10. The second digital signal type is encoded with at least one orthogonal code per each active subscriber station to define one or more downlink channels. For example, to achieve orthogonal transmit diversity, the second digital signal type is encoded with two distinct orthogonal codes, which define two downlink channels for each downlink transmission to a subscriber station. In one embodiment, the second digital signal type comprises an International Standard (IS)-95C signal.

In step S14, the first digital signal type and the second digital signal type are combined to provide a combined baseband signal. Further, the combined baseband signal is upconverted and amplified, as required, to provide a composite electromagnetic output signal associated with at least one coverage area (e.g., sector or a cell). The first digital signal type and the second digital signal type may be combined by using digital combiner 16, as shown in FIG. 1A; primary channel boards 112, as shown in FIG. 3A; or by using output channel board 44, as shown in FIG. 4A. The first digital signal type and the second digital signal type are defined to be compatible for such combination at baseband without the loss, corruption, or destruction of the information content of the first modulating information signal and the second modulating information signal. The upconverting and amplification of step S14 may be accomplished by the primary transmitter arrangement 20.

In step S16, a diverse electromagnetic output signal is provided based on the second digital signal type. The second digital signal type may represent a baseband signal, whereas the diverse electromagnetic signal represents a radio frequency or a microwave signal with spread-spectrum modulation (e.g., CDMA modulation). Further, the diverse electromagnetic signal may be amplified or otherwise processed. Step S16 may be accomplished by using the secondary transmitter arrangement 22.

The diverse electromagnetic output signal complements the composite electromagnetic output signal. The composite electromagnetic output signal is transmitted from at least one of a first set of antennas. The diverse electromagnetic output signal is transmitted from at least one of a second set of antennas. In one embodiment, the second set of antennas is spatially diverse from the first set of antenna. The first set of antennas and the second set of antennas are aligned to cover substantially the same coverage area (e.g., sector or cell).

In one embodiment, the composite electromagnetic output signal is transmitted over at least two carriers within different frequency ranges. The diverse electromagnetic output signal may be transmitted over at least two carriers within different frequency ranges simultaneously or non-simultaneously with the composite electromagnetic output signal.

In another embodiment, transmission of the composite electromagnetic output signal may be alternated between or among different diverse antennas in accordance with a defined sequence. Transmission of the diverse electromagnetic output signal may be alternated between or among different diverse antennas in accordance with a defined sequence simultaneously or non-simultaneously with the transmission of the composite electromagnetic output signal. The alternating transmission of the diverse electromagnetic output signal is preferably synchronized and coordinated with the transmission of the composite electromagnetic signal to avoid conflicts in antenna usage or undesired interference. Time guard bands, representing transmission prohibitions for discrete intervals, may be used to prevent such undesired interference.

The specification describes various illustrative embodiments of the invention. The scope of the claims is intended to cover various modifications and equivalent arrangements of illustrative embodiments disclosed in the specification. Therefore, the following claims should be accorded the reasonably broadest interpretation to cover modifications, equivalent structures, and features which are consistent with the spirit and scope of the invention.

What is claimed is:

1. A base station comprising:
   a plurality of primary channel boards for modulating and encoding a first digital signal type;
   a plurality of secondary channel boards for modulating and encoding a second digital signal type;
   a first plurality of transmit radio modules for accepting the first digital signal type and the second digital signal type and providing a composite electromagnetic output signal, each transmit radio module associated with a different sector; and
   a second plurality of transmit radio modules for accepting the second digital signal type from secondary channel boards and for providing a diverse electromagnetic output signal for complementing the composite electromagnetic output signal.

2. The base station according to claim 1 further comprising a digital combiner coupled to the primary channel boards and the secondary channel boards, the first plurality of radio modules accepting the second digital signal type from the combiner.

3. The base station according to claim 2 wherein the digital combiner, the secondary channel boards and the second plurality of transmit radio modules represent an upgrade assembly for addition to an existing base station including the primary channel boards and the first plurality of transmit radio modules.

4. The base station according to claim 2 wherein an output interface of a Kth secondary channel board of the secondary channel boards is coupled to the digital combiner.

5. The base station according to claim 1 further comprising:
   a first set of antennas for transmitting the composite electromagnetic output signal associated with the first plurality of radio modules; and
   a second set of antennas for transmitting the diverse electromagnetic output signal, the second set of antennas being spatially diverse from the first set of antennas and associated with the second plurality of radio modules.

6. The base station according to claim 1 wherein the first set of antennas and the second set of antennas are adapted to cover the same sectors.

7. The base station according to claim 1 wherein the first digital signal type comprises an International Standard (IS)-95A signal and wherein the second digital signal type comprises an IS-95C signal.

8. The base station according to claim 1 wherein the first digital signal type comprises an International Standard (IS)-95B signal and wherein the second digital signal type comprises an IS-95C signal.

9. The base station according to claim 1 wherein a controller is coupled to the primary channel boards and the secondary channel boards.

10. The base station according to claim 1 wherein an output interface of a Kth secondary channel board of the secondary channel boards is coupled to an input interface of a first primary channel board of the primary channel boards, where K is the total number of secondary channel boards.

11. The base station according to claim 1 wherein an output interface of a Kth secondary channel board of the secondary channel boards is coupled to an output channel board associated with the primary channel boards, where K is the total number of secondary channel boards, M−1 is the total number of primary channel boards, and M equals K.

12. A base station comprising:
   primary channel boards coupled in tandem to route at least a first digital signal type to signal branches associated with corresponding different sectors;
   a first plurality of transmit radio modules providing a first group of signal branches, each transmit radio module associated with a corresponding one of the different sectors, the first plurality of transmit radio modules accepting at least the first signal type from the primary channel boards;
   a second plurality of transmit radio modules providing a second group of signal branches; and
   secondary channel boards coupled in tandem, the secondary channel boards adapted to route a second digital signal type between the first signal branches and the second signal branches.

13. The base station according to claim 12 wherein an output stage of the secondary channel boards is coupled to an input stage of the primary channel boards.

14. The base station according to claim 12 wherein the primary channel boards include M boards and the secondary channel boards include K boards with M equaling K; an output interface of the Kth secondary channel board being coupled to an input interface of the first primary channel board.

15. The base station according to claim 12 further comprising an output channel board associated with M−1 primary channel boards, the secondary channel boards including K boards with M equaling K; an output interface of the Kth secondary channel board being coupled to an input interface of the output channel board.

16. The base station according to claim 12 further comprising:
   a pair of spatially diverse antennas for each sector, the second digital signal type and the first digital signal type sharing one antenna within the pair, the second digital signal type carried on another antenna within the same pair.

17. The base station according to claim 12 wherein the first digital signal type comprises an (International Standard) IS-95A signal and wherein the second digital signal type comprises an IS-95C signal.

18. The base station according to claim 12 wherein the first digital signal type comprises an (International Standard) IS-95B signal and wherein the second digital signal type comprises an IS-95C signal.

19. The base station according to claim 12 wherein the secondary channel boards and the second plurality of transmit radio modules represent a upgrade assembly for addition to an existing base station including the first transmit modules and the primary channel boards.

20. The base station according to claim 12 wherein a controller is coupled to the primary channel boards and the secondary channel boards.

21. The base station according to claim 12 the primary channel boards and the secondary channel boards are coupled to each other via an optical interface.

22. The base station according to claim 12 wherein primary channel boards and the secondary channel boards are coupled to each other via a multiconductor cable.

23. A method for transmitting transmit diversity signals, the method comprising:
   modulating and encoding a first digital signal type;
   modulating and encoding a second digital signal type;
   combining the first digital signal type and the second digital signal type to provide a composite electromagnetic output signal associated with at least one coverage area; and
   providing a diverse electromagnetic output signal, for complementing the composite electromagnetic output signal, based on the second digital signal type.

24. The method according to claim 23 further comprising:
   transmitting the composite electromagnetic output signal from at least one of a first set of antennas; and
   transmitting the diverse electromagnetic output signal from at least one of a second set of antennas, the second set of antennas being spatially diverse from the first set of antennas.

25. The method according to claim 24 further comprising the step of arranging the first set of antennas and the second set of antennas to cover substantially the same sectors.

26. The method according to claim 23 wherein the first digital signal type comprises an International Standard (IS)-95A signal and wherein the second digital signal type comprises an IS-95C signal.

27. The method according to claim 23 wherein the first digital signal type comprises an International Standard (IS)-95B signal and wherein the second digital signal type comprises an IS-95C signal.

28. The method according to claim 23 further comprising transmitting the composite electromagnetic output signal over at least two carriers within different frequency ranges.

29. The method according to claim 23 further comprising transmitting the diverse electromagnetic output signal over at least two carriers within different frequency ranges.

30. The method according to claim 23 further comprising alternating transmission of the composite electromagnetic output signal between or among different diverse antennas in accordance with a defined sequence.

31. The method according to claim 23 further comprising alternating transmission of the diverse electromagnetic output signal between or among different diverse antennas in accordance with a defined sequence.

* * * * *